L. F. GOODSPEED.
CONTROL MECHANISM.
APPLICATION FILED OCT. 10, 1910.
1,101,692.
Patented June 30, 1914.
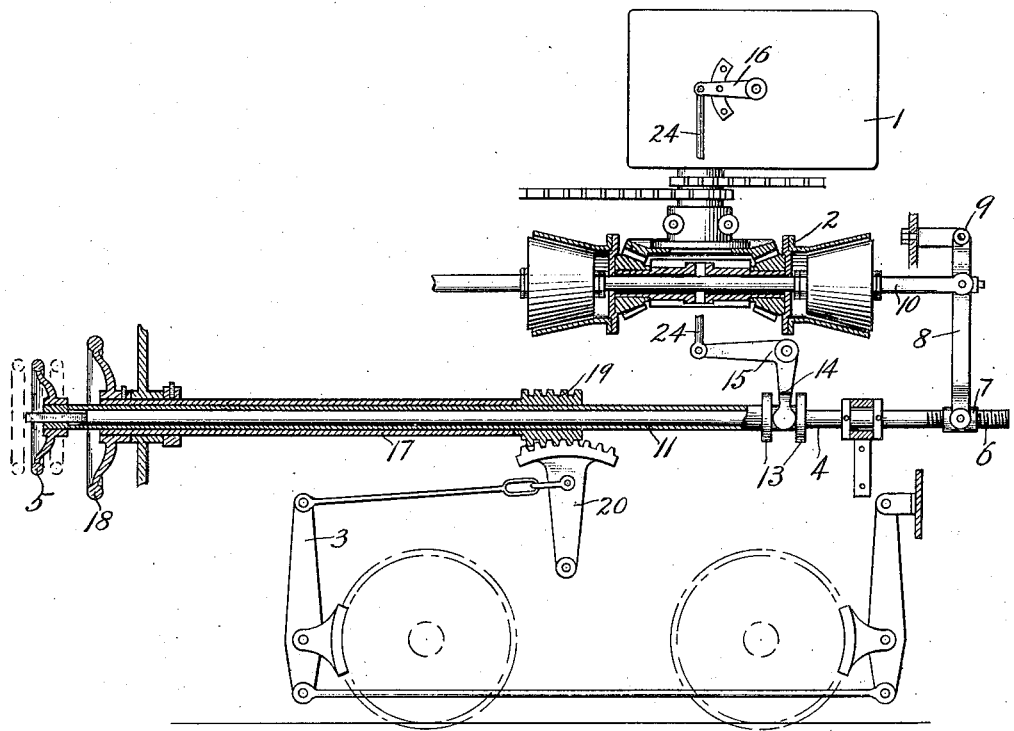
WITNESSES
INVENTOR
Leland F. Goodspeed
by Wm. M. Cady
Att'y.

UNITED STATES PATENT OFFICE.

LELAND F. GOODSPEED, OF MILWAUKEE, WISCONSIN, ASSIGNOR TO MILWAUKEE LOCOMOTIVE MANUFACTURING COMPANY, OF MILWAUKEE, WISCONSIN, A CORPORATION OF WISCONSIN.

CONTROL MECHANISM.

1,101,692. Specification of Letters Patent. Patented June 30, 1914.

Application filed October 10, 1910. Serial No. 586,219.

*To all whom it may concern:*

Be it known that I, LELAND F. GOODSPEED, a citizen of the United States, residing at Milwaukee, in the county of Milwaukee and State of Wisconsin, have invented new and useful Improvements in Control Mechanism, of which the following is a specification.

This invention relates to controlling mechanism for motor vehicles, and more particularly in connection with motor vehicles adapted to run on rails.

The principal object of my invention is to provide an improved controlling mechanism for motor vehicles of simple construction and adapted to be readily and conveniently manipulated.

In the accompanying drawings; the figure is a diagrammatic view of a rail motor car equipment, with my improvements applied thereto.

The rail motor vehicle equipment shown diagrammatically in the drawing comprises a change speed gear mechanism 1, forward and reversing clutch mechanism 2, and a brake mechanism 3. For the purposes of the present invention the particular construction of the above mechanisms is not material.

According to my invention, a central controlling shaft 4 is provided, one end of which is squared to carry a hand wheel 5, free to move longitudinally thereon, and having a threaded portion 6 on its opposite end for a nut 7. A lever 8, fulcrumed at 9, is secured at one end to the nut 7, so that rotation of the shaft 4 causes a longitudinal movement of the nut 7 and a corresponding to-and-fro movement of the lever 8. Said lever 8 is operatively connected to the shaft 10 of the forward and reversing clutch mechanism 2 and thus by rotating the hand wheel 5 the clutch mechanism 2 may be operated to throw in either one of the clutches as desired.

Mounted on the central shaft 4 is a tubular shaft 11, on one end of which is secured the hand wheel 5 and having on its opposite end collars 13 between which a fork 14 operates. Said fork forms part of a rocker arm 15 which is operatively connected by a rod 24 to an arm 16 for the purpose of controlling the change speed gear mechanism 1. By shifting the hand wheel 5 longitudinally, the tubular shaft 11 may be moved either backward or forward and thereby the arm 16 of the change gear mechanism may be shifted to its different controlling positions. A second tubular shaft 17 is mounted on the tubular shaft 11 and has a hand wheel 18 secured on one end, the opposite end being provided with a worm wheel 19 adapted to engage with a worm gear segment 20. Said segment is operatively connected to the brake mechanism 3, and so, upon turning the hand wheel 18 the worm 19 is rotated and a to-and-fro movement is thereby imparted to the segment 20, to effect the application and the release of the brakes. It will now be evident that three separate mechanisms are controlled by the manipulation of only two hand wheels, any one of which may be operated at will and independently of the others.

Having now described my invention, what I claim as new and desire to secure by Letters Patent, is:—

1. A control mechanism for motor vehicles comprising a central shaft for operating one vehicle mechanism, a tubular shaft mounted on said central shaft for operating another vehicle mechanism, a single manually operated device adapted to impart a longitudinal movement to said tubular shaft and a rotary movement to the other shaft.

2. A control mechanism for motor vehicles comprising a central shaft and a tubular shaft carried by the central shaft, said tubular shaft being adapted by a longitudinal movement to operate one vehicle mechanism and the other shaft by a rotary movement another vehicle mechanism, and a single hand wheel for rotating said central shaft and for imparting a longitudinal movement to the other shaft.

3. A control mechanism comprising a central shaft, a hollow shaft mounted on said central shaft, said central shaft being adapted to operate one vehicle mechanism by a rotative movement and the other shaft another mechanism by a longitudinal movement, a single hand wheel for operating both shafts, a second hollow shaft surrounding the first hollow shaft for operating a third vehicle mechanism, and another hand wheel for actuating said second hollow shaft.

4. A control mechanism for motor vehicles, comprising a tubular shaft for operating one vehicle mechanism, a central shaft located within said tubular shaft and having a sliding but non-rotatable connection therewith, and a single handle fastened to said tubular shaft for reciprocating the same and for rotating both shafts.

In testimony whereof I hereunto set my hand.

LELAND F. GOODSPEED.

Witnesses:
B. A. OLIVER,
A. M. CLEMENTS.